United States Patent
Vijayakumar et al.

(10) Patent No.: US 9,926,836 B2
(45) Date of Patent: Mar. 27, 2018

(54) SYSTEM AND METHOD FOR OXIDANT TEMPERATURE CONTROL

(71) Applicant: General Electric Company, Schenectady, NY (US)

(72) Inventors: Diwakar Memangalam Vijayakumar, Bangalore (IN); Rajesh Kumar Jayaram, Bangalore (IN); Sreekanth James Madireddy, Bangalore (IN)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 14/790,714

(22) Filed: Jul. 2, 2015

(65) Prior Publication Data

US 2017/0002722 A1  Jan. 5, 2017

(51) Int. Cl.
| | | |
|---|---|---|
| *F02B 39/04* | (2006.01) | |
| *F02B 1/12* | (2006.01) | |
| *F02B 29/04* | (2006.01) | |
| *F01P 3/12* | (2006.01) | |
| *F02D 35/02* | (2006.01) | |
| *F02D 41/00* | (2006.01) | |
| *F01P 3/00* | (2006.01) | |
| *F01P 7/14* | (2006.01) | |

(52) U.S. Cl.
CPC .............. *F02B 1/12* (2013.01); *F01P 3/12* (2013.01); *F02B 29/0412* (2013.01); *F02B 29/0418* (2013.01); *F02B 29/0443* (2013.01); *F02B 29/0493* (2013.01); *F02D 35/023* (2013.01); *F02D 41/0007* (2013.01); *F01P 7/14* (2013.01); *F01P 2003/001* (2013.01); *F02B 39/04* (2013.01); *Y02T 10/146* (2013.01)

(58) Field of Classification Search
CPC ........ F02B 39/04; F01P 7/14; F01P 2003/001
USPC ............................................ 123/27 R, 41.57
See application file for complete search history.

(56) References Cited

U.S. PATENT DOCUMENTS

| | | | |
|---|---|---|---|
| 4,317,439 A | 3/1982 | Emmerling | |
| 7,100,584 B1* | 9/2006 | Bruestle | F02B 29/0418 |
| | | | 123/563 |
| 7,257,950 B2 | 8/2007 | Iwaszkiewicz | |
| 2009/0050117 A1 | 2/2009 | Tai et al. | |
| 2011/0000469 A1* | 1/2011 | Lauberts | F02B 29/0412 |
| | | | 123/564 |

(Continued)

FOREIGN PATENT DOCUMENTS

GB          2483271 A        3/2012

OTHER PUBLICATIONS

International Search Report issued in connection with corresponding Application No. PCT/US2016/036436 dated Sep. 13, 2016.

*Primary Examiner* — Jacob Amick
*Assistant Examiner* — Charles Brauch
(74) *Attorney, Agent, or Firm* — Fletcher Yoder, P.C.

(57) ABSTRACT

A system includes a compressed air system configured to couple to an engine. The compressed air system includes a compression device configured to compress an air flow, a heat exchanger configured to exchange heat with the air flow along a first flow path, and a bypass system configured to flow the air along a second flow path that bypasses the heat exchanger. The compressed air system is configured to selectively flow the airflow along the first flow path, the second flow path, or a combination thereof, to the engine.

15 Claims, 4 Drawing Sheets

(56) References Cited

U.S. PATENT DOCUMENTS

| | | | |
|---|---|---|---|
| 2012/0129066 A1* | 5/2012 | Ben-Aicha | F01P 7/165 |
| | | | 429/435 |
| 2012/0325185 A1* | 12/2012 | Baumann | F02B 29/0412 |
| | | | 123/568.15 |
| 2013/0291811 A1* | 11/2013 | Kuhlbach | F02F 1/243 |
| | | | 123/41.72 |
| 2013/0298554 A1 | 11/2013 | Sellnau | |
| 2015/0040874 A1 | 2/2015 | Isermeyer et al. | |

\* cited by examiner

SYSTEM AND METHOD FOR OXIDANT TEMPERATURE CONTROL

BACKGROUND

The subject matter disclosed herein relates to compression ignition engines, and more particularly to homogeneous charge compression ignition (HCCI) and pre-mixed charge compression ignition (PCCI) engines utilizing a charged oxidant flow.

An internal combustion engine (e.g., reciprocating engine such as a diesel, gasoline, or gas engine) combusts fuel with an oxidant (e.g., air) to generate hot combustion gases, which in turn drive an engine member (e.g., piston, rotor, blade). The engine member may be coupled to a shaft that rotates to power a load. Traditional industrial engines can operate under a variety of operating conditions (e.g., temperature, pressure, air-fuel mixture) for a particular load condition. However, suitable operating conditions for HCCI and PCCI engines may vary greatly based on the load conditions.

In HCCI engines, the fuel and air mixture may be pre-mixed. In HCCI and PCCI engines, auto-ignition and rates of combustion are largely affected by the composition, temperature, and/or pressure of a charged oxidant flow during the compression stroke. However, dynamic load conditions on the HCCI and PCCI engines affects the desired composition, pressure, and temperature of the fuel and air mixture, thereby complicating the control of HCCI and PCCI engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a compressed air system configured to couple to an engine. The compressed air system includes a compression device configured to compress an air flow, a heat exchanger configured to exchange heat with the air flow along a first flow path, and a bypass system configured to flow the air along a second flow path that bypasses the heat exchanger. The compressed air system may be configured to selectively flow the airflow along the first flow path, the second flow path, or a combination thereof, to the engine.

In one embodiment, a system may include a controller configured to control a temperature of a compressed air flow provided to an engine. The controller may be configured to control the temperature via control of an oxidant ratio and a coolant ratio. The oxidant ratio may include a first ratio between a bypass air flow that bypasses a heat exchanger and the compressed air flow provided to the engine, and the coolant ratio comprises a second ratio between a bypass coolant flow that bypasses the heat exchanger and a remainder coolant flow through the heat exchanger.

In one embodiment, a method may include compressing an air flow to form a compressed air flow to be provided to an engine, and controlling the temperature of the compressed air flow provided to the engine. Controlling the temperature of the compressed air flow may include cooling a portion of the compressed air flow via a heat exchanger, controlling a bypass air flow that bypasses the heat exchanger, and providing the portion of the compressed air flow and the bypass air flow to the engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
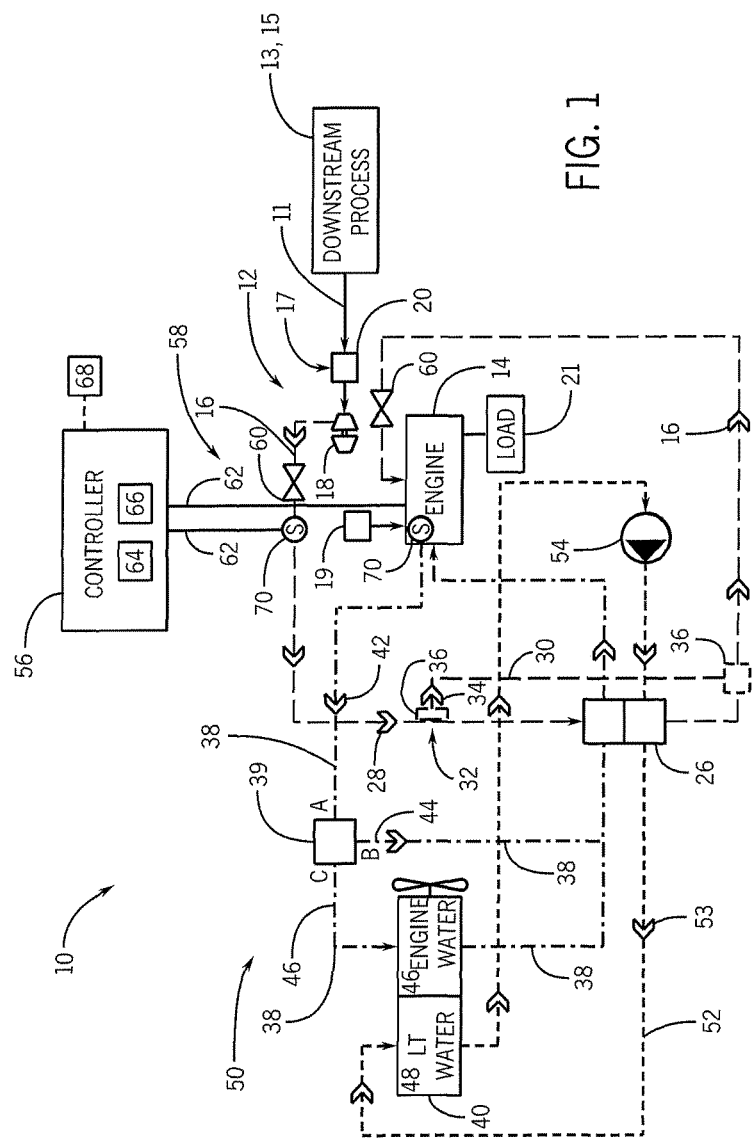
FIG. 1 is a block diagram of an embodiment of a system having a compressed oxidant system coupled to an engine with a bypass line and a controller.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The system and methods described herein control the temperature of a charged oxidant flow supplied to a homogeneous charge compression ignition (HCCI) or pre-mixed charge compression ignition (PCCI) operating engines in response to varying loads. Active control of the temperature of the charged oxidant system enables faster, more accurate transitions between varying loads on the engine. In some embodiments, the flow rate, composition, and pressure of the charged oxidant system may also be controlled. A compressed air system may be configured to couple to an engine, and the compressed air system may include a compression device to compress an air flow, a heat exchanger configured to exchange heat with the air flow along a first flow path, and a bypass system configured to flow air along a second flow path that bypasses the heat exchanger. The compressed air system may be configured to selectively flow the air flow along the first flow path, the second flow path, or a combination thereof, to the engine. The charged oxidant (e.g., compressed air) system may include a first coolant circuit and a second coolant circuit connected to a radiator that has a high pressure and a low pressure stage. The high pressure stage is coupled to the first coolant circuit, and the low pressure stage is coupled to the second coolant circuit. A heat exchanger (e.g., intercooler) may be coupled to a first coolant circuit, such that the heat exchanger is configured to transfer heat from a portion of the compressed air flow to a first water flow through the first coolant circuit. The low pressure stage is configured to transfer heat from the portion of the compressed air flow to a second water flow through the second coolant circuit. Bypass lines may be present in the compressed air system so that a bypass line of the compressed air flow may remain at a warmer temperature compared to the portion of the compressed air flow that is cooled via the heat exchanger. Additionally, or in the alternative a heat exchanger bypass line may be present to enable a bypass portion of the heat exchanger flow (e.g., water) to bypass the heat exchanger, such that the bypass portion may remain at higher temperatures. Both the bypass line and the heat exchanger bypass line may be independently controlled to control the temperature, flow rate, pressure, and/or composition of the compressed air flow such that the ignition timing for the HCCI and/or PCCI engines may be quickly adjusted to correspond with various loadings. The bypass portion and the heat exchanger bypass portion may be independently controlled during a start-up sequence of the engine, during steady-state operation (e.g., driving a load, operating in a simple cycle or combined cycle power plant), during shutdown of the engine, or any combination thereof, thereby enabling rapid ignition timing adjustments for varying (e.g., dynamic) loads during operation of the engine.

FIG. 1 is a block diagram of an embodiment of a system 10 having a compressed oxidant system 12 coupled to an engine 14 with a bypass line 30 and a controller 56. In certain embodiments, the engine 14 is coupled to a load 21, such as a generator, a mechanical drive, or machinery. The engine 14 receives fuel 19 (e.g., diesel, natural gas, coal seam gases, associated petroleum gas, etc.) or a mixture of both the fuel 19 and a charged oxidant flow or compressed air flow 16 (e.g., air, oxygen, oxygen-enriched air, or any combination thereof). Although the following discussion refers to the charged oxidant flow 16 as air, any suitable oxidant (e.g., oxygen, oxygen-enriched air, exhaust gas, oxygen-enriched exhaust gas) may be utilized with the disclosed embodiments. In some embodiments, the compressed air flow 16 may be mixed with exhaust gas recirculation (EGR) gases 15. The EGR gases 15 may be introduced and mixed with the compressed air flow 16 upstream and/or downstream of the bypass line 30.

The engine 14 may be a reciprocating or piston engine (e.g., internal combustion engine). The engine 14 may be a compression-ignition engine. The engine 14 may be a natural gas engine, gasoline engine, diesel engine, or dual fuel engine. The engine 14 may be a two-stroke engine, three-stroke engine, four-stroke engine, five-stroke engine, or six-stroke engine. The engine 14 may also include any number of cylinders (e.g., 1-24 cylinders or any other number of cylinders) and associated piston and liners. In some such cases, the cylinders and/or the pistons may have a diameter of between approximately 13.5-34 centimeters (cm). In some embodiments, the cylinders and/or the pistons may have a diameter of between approximately 10-40 cm, 15-25 cm, or about 15 cm. The system 10 may generate power ranging from 10 kW to 10 MW. In some embodiments, the engine 14 may operate at less than approximately 1800 revolutions per minute (RPM). In some embodiments, the engine 14 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 14 may operate between approximately 750-2000 RPM, 900-1800 RPM, or 1000-1600 RPM. In some embodiments, the engine 14 may operate at approximately 1800 RPM, 1500 RPM, 1200 RPM, 1000 RPM, or 900 RPM. Exemplary engines 14 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

In the illustrated embodiment, the compressed oxidant system 12 includes a compressed air flow 16. The compressed air flow 16 is discharged from a compression device 18. The compression device 18 may include, but is not limited to, a compressor, a supercharger, or a turbocharger, or any combination thereof. The compression device 18 may be coupled to a cleaner 20 (e.g., scrubber, particulate matter filter) disposed upstream of the compression device 18 which receives a fluid (e.g., oxidant, air, oxygen-enriched air). The cleaner 20 may be utilized to remove particulates from a fluid input 11. In certain embodiments, the fluid input 11 (e.g., oxidant) is received from a downstream process 13 (e.g., exhaust gas recirculation conduit), or the fluid input 11 may be provided to the compression device 18 from the ambient environment 17.

As discussed in further detail below, the embodiments of the compressed oxidant system 12 are configured to bypass various areas of the system 10 to facilitate rapid control of an oxidant temperature to enable an engine 14 to efficiently drive different loads 21. As described above, varying the load 21 may affect the desired temperature of the compressed air flow 16 to aid the timing of homogeneous charge compression ignition (HCCI) and pre-mixed charged compression ignition (PCCI) of the engine 14.

In some embodiments, the system 10 may not include all of the components illustrated in FIG. 1. In addition, the system 10 may include additional components such as an exhaust stack, silencer, control components, and/or heat recovery components. The system 10 may generate power ranging from 10 kW to 10 MW or greater. Besides power generation, the system 10 may be utilized in other applications such as those that recover heat and utilize the heat (e.g., combined heat and power applications), combined heat, power, and cooling applications, applications that also recover exhaust components (e.g., carbon dioxide) for further utilization, gas compression applications, and mechanical drive applications. Embodiments of the present disclosure include a compressed oxidant system 12 coupled to an engine 14 and configured to decrease the response time and improve control of an oxidant temperature to enable the engine 14 to operate efficiently at varying loads 21. In some embodiments, a controller 56 may enable precise control of one or more properties (e.g., temperature, pressure, composition) of the compressed air flow 16. As may be appreciated, varying (e.g., dynamic) loads on the engine 14 may correspond to different desired temperatures of the compressed air flow 16 supplied to the HCCI and/or PCCI for proper ignition timing.

The compressed oxidant system 12 provides the compressed air flow 16 to the engine 14. The compressed oxidant system 12 includes a heat exchanger 26 (e.g., an intercooler) disposed downstream of the compression device 18 between the compression device 18 and the engine 14. The heat exchanger 26 is configured to receive and cool at least a portion 28 of the compressed air flow 16. The compressed oxidant system 12 may include the bypass line 30 that directs a bypass portion 34 of the compressed air flow 16 to bypass the heat exchanger 26. The bypass line 30 is disposed between the engine 14 and a bypass port 32 that is upstream of the heat exchanger 26. That is, the bypass port 32 is disposed between the heat exchanger 26 and the compression device 18. A bypass control valve 36 that controls (e.g., divides) the compressed air flow 16 into the portion 28 and the bypass portion 34 may be disposed along the compressed air flow 16 upstream or downstream of the heat exchanger 26. As discussed herein, the bypass portion 34 may be defined as the compressed air flow 16 minus the portion 28, which is cooled by the heat exchanger 26. Accordingly, the bypass portion 34 may include approximately ⅛, ¼, ⅓, ⅜, ½, ⅝, ⅔, ¾, ⅞, or more of the compressed air flow 16. In some embodiments, the bypass line 30 may not be utilized, resulting in approximately none of the compressed air flow 16 being directed as the bypass portion 34. In other embodiments, the approximately entire amount of the compressed air flow 16 may be directed to the bypass line 30 as the bypass portion 34. In some embodiments, the heat exchanger 26 is configured to transfer heat from the portion 28 of the compressed air flow 16 to another system or medium (e.g., coolant system 50, ambient environment). The coolant system 50 circulates a coolant, which may include but is not limited to water, alcohol, or oil, or any combination thereof. The heat exchanger 26 may transfer heat from the portion 28 to a first coolant circuit 38. The first coolant circuit 38 may be disposed between and coupled to the engine 14 and a radiator 40. In some embodiments, the temperature of engine coolant 42 of the first coolant circuit 38 may range from approximately 80 to 130° C., or 90 to 120° C., or 110 to 110° C., and all subranges therebetween. In some embodiments, the engine coolant 42 may be configured to discharge from the engine 14 via the first coolant circuit 38 to be received by the radiator 40. In some embodiments, a portion 44 of the first coolant circuit 38 may be directed back to the engine 14 after bypassing the radiator 40 via valve 39. In some embodiments the portion 44 of the first coolant circuit 38 that bypasses the radiator 40 includes approximately ⅛, ¼, ⅓, ⅜, or ½ of the first coolant circuit 38 flow. The portion 44 that bypasses the radiator 40 may pass through the heat exchanger 26 prior to returning to the engine 14.

The radiator 40 may include a high pressure stage 46, a low pressure stage 48, or any combination thereof. The high pressure stage 46 may be coupled to the first coolant circuit 38 and may operate between approximately 600 to 1,200 kPa, or 650 to 1,050 kPa, or 700 kPa to 900 kPa, and all subranges therebetween. The first coolant circuit 38 is configured to receive (e.g., absorb) heat from the portion 28 of the compressed air flow 16 into a first coolant flow 42 (e.g., water) through the first coolant circuit 38. In some embodiments, the low pressure stage 48 is coupled to a second coolant circuit 52. The second coolant circuit 52 is configured to receive (e.g., absorb) heat from the portion 28 of the compressed air flow 16 into a second coolant flow 53 (e.g., water, engine coolant 42) through the second coolant circuit 52. The low pressure stage 48 of the radiator 40 may operate between approximately 300 to 750 kPa, or 350 to 700 kPa, or 400 to 600 kPa, and all subranges therebetween. In some embodiments, an engine cooling system 50 may include the radiator 40 coupled to the engine 14 and the heat exchanger 26. In some embodiments, the first coolant circuit 38 may be coupled to the radiator 40, the engine 14, and the heat exchanger 26. The second coolant circuit 52 may be coupled to the radiator 40 and the heat exchanger 26. In some embodiments, the second coolant circuit 52 may operate at a lower temperature than the first coolant circuit 38. For example, the temperature of the second coolant 53 of the second coolant circuit 52 may operate from approximately 60 to 90° C., or 65 to 85° C., or 70 to 75° C., and all subranges therebetween. The coolants (e.g., engine coolant 42, second coolant 53) in the first coolant circuit 38 and the second coolant circuit 52 may flow between the high pressure stage 46 and the low pressure stage 48. In some embodiments, a water pump 54 may control the pressure and the temperature of the second coolant circuit 52. The water pump 54 may be controlled by the controller 56.

Presently contemplated embodiments may include the controller 56 coupled to the compressed oxidant system 12. The controller 56 may be coupled via control lines 62 to at least one valve assembly 58. The controller 56 may be configured to open and close the valves 60 to control the flow of the compressed air flow 16 through the valve assembly 58. Additionally, or in the alternative, the controller 56 may be configured to adjust valves 39 that control the flow of one or more coolant flows 42, 53 through the coolant system 50. In certain embodiments, the controller 56 may include a memory 64 to store instructions and a processor 66 configured to the process the instructions. The controller 56 may include an operator interface 68 to display various readings taken from sensors 70 disposed about the coolant system 50. Also, the operator interface 68 may display positioning of the valves 36, 39, 60 of the compressed oxidant system 12 and coolant system 50. The controller 56 may receive input, such as a desired operating load 21, temperature of the compressed air flow 16, pressure of the compressed air flow 16, or any other condition affecting homogeneous charge compression ignition (HCCI) or premixed charged compression ignition (PCCI) of the engine 14.

In some embodiments, the controller 56 may control the flow of the compressed air flow 16 based in part on a result of a signal received from the one or more sensors 70. The sensors 70 may be configured to measure various properties of the system 10, including but not limited to temperature, pressure, composition (e.g., oxygen concentration), vibration, flow rate, or any combination thereof. The sensors 70 may be disposed along the compressed oxidant system 12, including within or adjacent (e.g., downstream) of the compression device 18, within or adjacent to the engine 14, along the compressed air flow 16, the first coolant circuit 38, the second coolant circuit 52, within or adjacent to (e.g., upstream, downstream) the heat exchanger 26, or any other place suitable for measuring a system property as described above. The sensors 70 can include, but are not limited to, temperature sensors (e.g., thermocouples, thermoresistors, RTD), fluid level sensors, pressure sensors, composition sensors (e.g., lambda sensors), motion sensors (e.g., accelerometers), or any other sensors suitable for determining or measuring an operating condition affecting the compressed oxidant system 12. In some embodiments, a bypass control valve 36 may be coupled to the bypass line 30 such that the bypass control valve 36 is configured to control a ratio of the bypass portion 34 to the relatively cool compressed air flow portion 28 (e.g., remainder) that flows through the heat exchanger 26. In some embodiments, the bypass portion 34 is approximately ⅛, ¼, ⅓, ⅜, or ½, or more of the first coolant circuit 38 flow. Through control of the bypass control valve 32, the controller 56 may adjust the temperature of the compressed air flow 16 provided to the engine 14 by adjusting the ratio of the bypass portion 34 to the relatively cool compressed air flow portion 28 (e.g., remainder). When the bypass portion 34 is increased, the portion 28 is decreased, thereby enabling the temperature of the compressed air flow 16 to maintain a hotter temperature than when the bypass portion 34 is decreased. When the bypass portion 34 is decreased, the portion 28 is increased, thereby decreasing the temperature of the compressed air flow 16.

In some embodiments, the controller 56 is configured to control the bypass control valve 32 to control the temperature and/or pressure of the compressed air flow 16 provided to the engine 14 based at least in part on the load 21 coupled to the engine 14. By controlling the temperature, pressure, flow rate, and/or composition of the compressed air flow 16 precisely by utilizing the charged oxidant system 12, the engine 14 may be utilized in cold weather conditions such that the engine 14 does not need cold weather protection and is not coupled to a cold weather package. Through use of the charged oxidant system 12, cold weather packages may be eliminated in some instances because temperature control of the compressed air flow 16 can be achieved as described above, enabling rapid heating of the compressed air flow 16.

Figure 2:
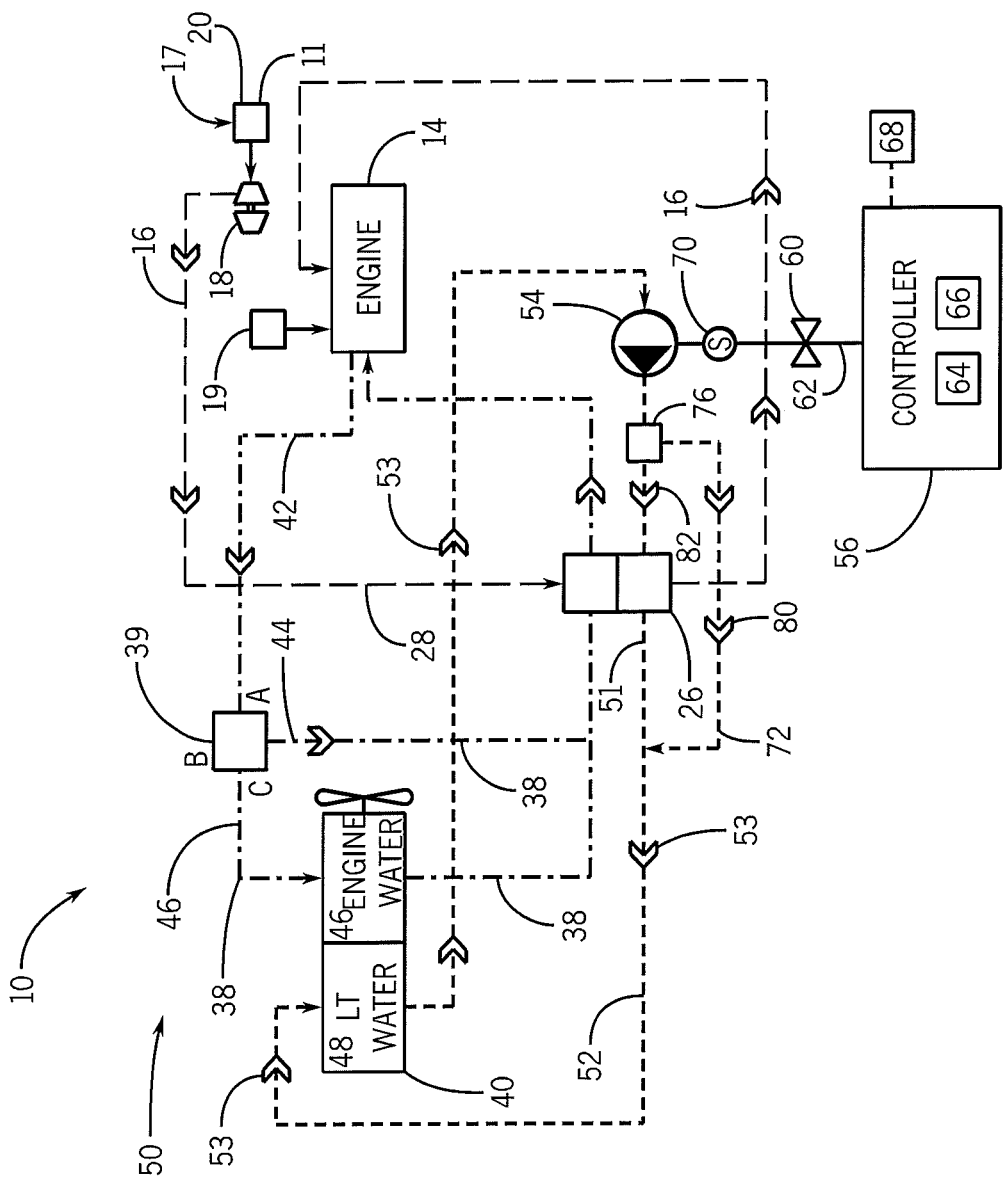
FIG. 2 is a block diagram of an embodiment of a system having a compressed oxidant system coupled to an engine and a heat exchanger bypass line.

FIG. 2 is a block diagram of an embodiment of a system 10 having a compressed oxidant system 12 coupled to an engine 14 and a heat exchanger bypass line 72. In some embodiments, a coolant circuit (e.g., the second coolant circuit 52) may include a heat exchanger bypass line 72 to control the temperature of the second coolant circuit 52 such that the temperature of the coolant fluid 53 of the second coolant circuit 52 decreases (e.g., is lower) when the coolant fluid 53 (e.g., water) bypasses the heat exchanger 26. When the remainder coolant 51 (e.g., the portion of the coolant flowing through the heat exchanger 26) is increased, the bypass coolant portion 80 is decreased, thereby decreasing the temperature of the compressed air flow 16. When the remainder coolant 51 is decreased, the bypass coolant portion 80 is increased, thereby enabling the temperature of the compressed air flow 16 to remain hotter than when the remainder coolant 51 is increased.

A heat exchanger bypass valve 76 may be disposed between the water pump 54 of the second coolant circuit 52 and the radiator 40 such that the heat exchanger bypass line 72 is configured to receive a bypass coolant portion 80 of the second coolant 53. The heat exchanger bypass valve 76 may be disposed upstream or downstream of the heat exchanger 26. The bypass coolant portion 80 may include the coolant flow 53 of the second coolant circuit 52 less a portion 82 of the second coolant 53 received by the heat exchanger 26. In some embodiments, the controller 56 may be configured to open and close the heat exchanger bypass valve 76 to control the flow of the heat exchanger bypass line 72. The controller 56 may be configured to receive signals from one or more sensors 70 disposed along the second coolant circuit 52, the heat exchanger bypass line 72, upstream or downstream from the heat exchanger bypass valve 76, within or adjacent (e.g. downstream) of the compression device 18, within or adjacent to the engine 14, or any other place suitable for measuring an operating condition of the charged oxidant system 12. The controller 56 may utilize one or more valves 60 to control various flow rates in the charged oxidant system 12. In some embodiments, the controller 56 may be configured to adjust the flow rate of the second coolant 53 through the heat exchanger bypass line 72. The heat exchanger bypass line 72 may include approximately ⅛, ¼, ⅓, ⅜, ½, ⅝, ⅔, ¾, ⅞, or more of the second coolant 53 of the second coolant circuit 52. In some embodiments, the heat exchanger bypass line 72 may not be utilized, resulting in approximately none of the second coolant 53 being directed to the heat exchanger bypass line 72. In other embodiments, the entire amount of the flow of the second coolant 53 may be directed to the heat exchanger bypass line 72. The controller 56 may be configured to control the temperature of the compressed air flow 16 provided to the engine 14 via control of an oxidant ratio and a coolant ratio. The oxidant ratio is defined as a first ratio between a bypass oxidant flow 34 that bypasses the heat exchanger 26 and the compressed air flow 16 provided to the engine 14. The coolant ratio is defined as a second ratio between a bypass coolant flow 72 that bypasses the heat exchanger 26 and a remainder coolant flow through the heat exchanger 26. In some embodiments, the controller 56 may be configured to control the temperature of the compressed air flow 16 based at least in part on the load 21 driven by the engine 14. By controlling the oxidant ratio and the coolant ratio to control the temperature of the compressed air flow 16, the engine 14 may be utilized in cold weather conditions such that the engine 14 is not coupled to a cold weather package. That is, the charged oxidant system 12 described herein enables rapid heating and temperature control of the compressed air flow 16.

Figure 3:
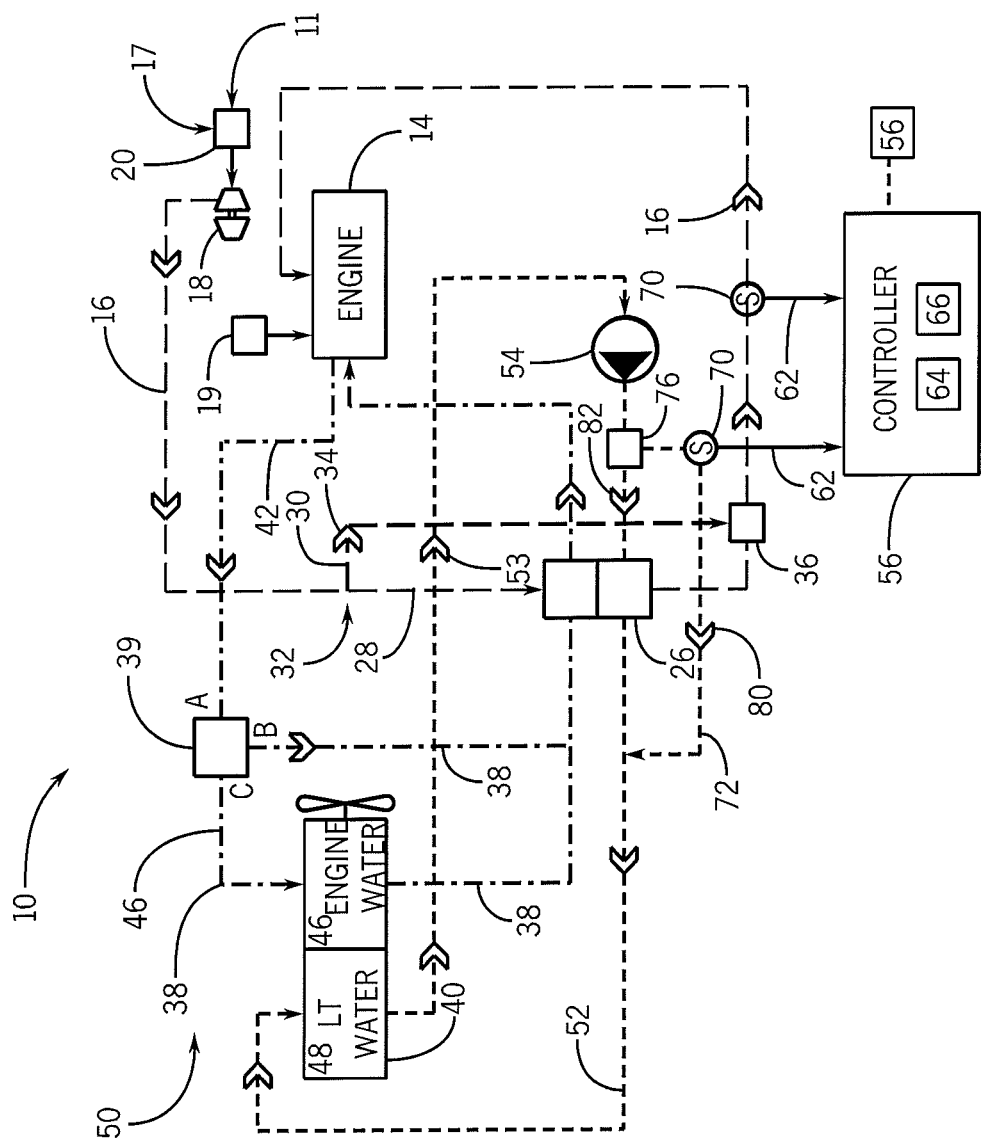
FIG. 3 is a block diagram of an embodiment of a system having a compressed oxidant system coupled to an engine with a bypass line and a heat exchanger bypass line.

FIG. 3 is a block diagram of an embodiment of a system 10 having a compressed oxidant system 12 coupled to an engine 14 with a bypass line 30 and a heat exchanger bypass line 72. As may be appreciated, the compressed oxidant system 12 of FIG. 3 has a bypass line 30 similar to FIG. 1, and a heat exchanger bypass line 72 similar to FIG. 2. The bypass portion 34 may be controlled by the controller 56, as described above with FIG. 1. The bypass portion 34 may be defined as the compressed air flow 16 minus the portion 28 which is cooled by the heat exchanger 26. In some embodiments, the bypass portion 34 may include approximately ⅛, ¼, ⅓, ⅜, ½, ⅝, ⅔, ¾, ⅞, or more of the compressed air flow 16. In some embodiments, the bypass portion 34 may not be utilized resulting in approximately none of the compressed air flow 16 being directed to bypass line 30. In other embodiments, the entire amount of the compressed air flow 16 may be directed to the bypass line 30. When a bypass portion 34 is increased, the portion 28 is decreased, resulting in the compressed air flow 16 remaining hotter than when the bypass portion 34 is decreased. When the bypass portion 34 is decreased, the portion 28 is increased, thereby cooling the compressed air flow 16. As such, adjusting the ratio of the bypass portion 34 to the portion 28 enables rapid temperature control of the compressed air flow 16.

In some embodiments, a heat exchanger bypass valve 76 may be disposed between the water pump 54 of the second coolant circuit 52 and the radiator 40 such that the heat exchanger bypass line 72 is configured to receive a bypass coolant portion 80 of the second coolant circuit 52. The bypass coolant portion 80 may include the coolant flow 53 of the second coolant circuit 52 less a portion 82 of the second coolant circuit 52 received by the heat exchanger 26. As described above, the controller 56 may be configured to open and close the heat exchanger bypass valve 76 to control the flow of the heat exchanger bypass line 72. In some embodiments, the controller 56 may be configured to adjust the flow rate of the coolant flow 53 of the bypass coolant portion 80. In some embodiments, the bypass coolant portion 80 may include approximately ⅛, ¼, ⅓, ⅜, ½, ⅝, ⅔, ¾, ⅞, or more of the flow of the heat exchanger bypass line 72. When a bypass coolant portion 80 is increased, the remainder coolant 51 is decreased, enabling the compressed air flow 16 to remain hotter than when the bypass coolant portion 80 is decreased. When the bypass coolant portion 80 is decreased, the remainder coolant 51 is increased, thereby cooling the compressed air flow 16.

Figure 4:
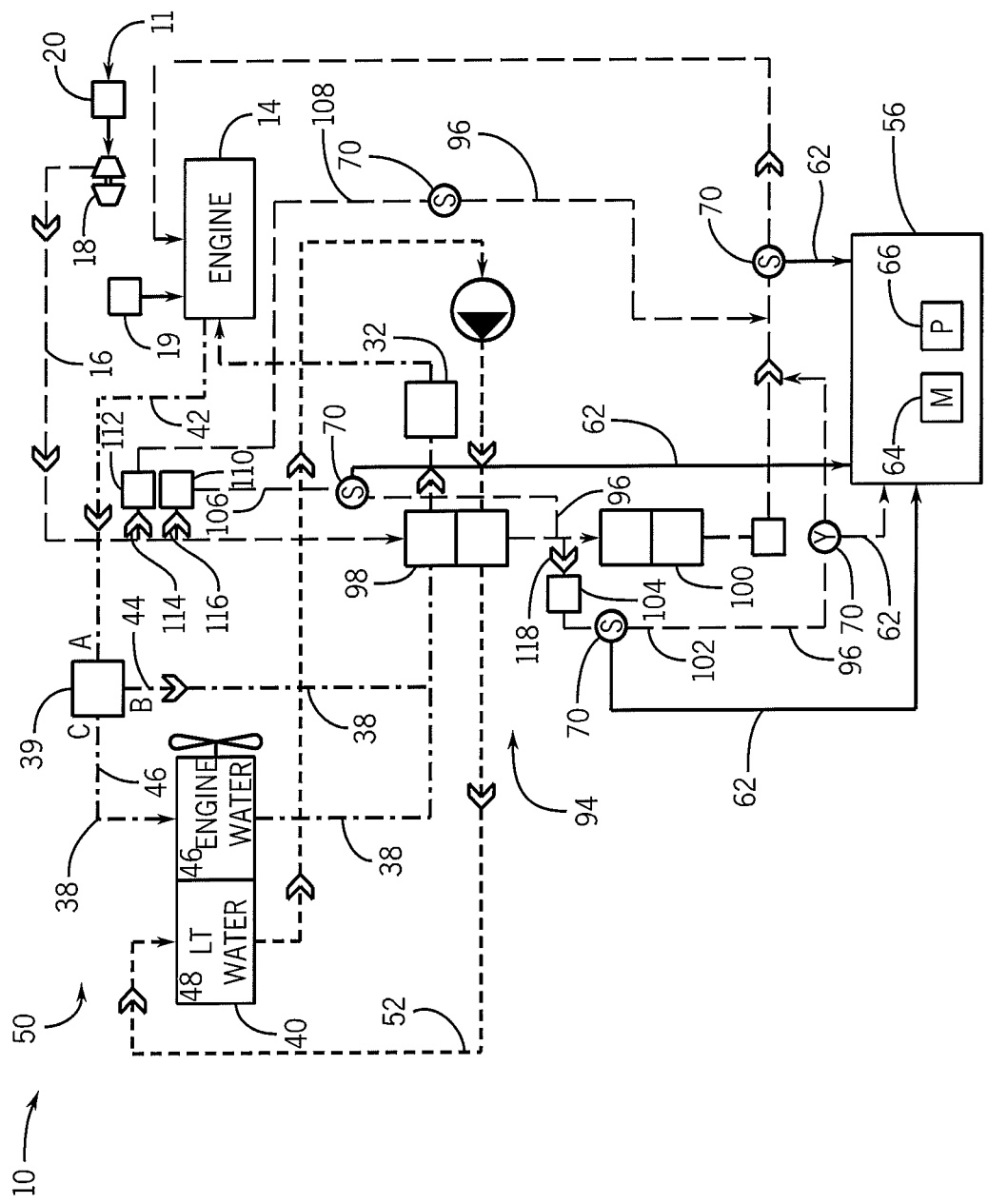
FIG. 4 is a block diagram of an embodiment of a system having a compressed oxidant system coupled to an engine with a two stage heat exchanger.

FIG. 4 is a block diagram of an embodiment of a system 10 having a compressed oxidant system 12 coupled to an engine 14 with a two stage heat exchanger 94 (e.g., first stage 98, second stage 100). The system 10 may include more than one heat exchanger 94. As described in further detail below, the compressed oxidant system 12 may include multiple bypass lines 30 (e.g., a first bypass line 102, a second bypass line 106, a third bypass line 108). In some embodiments, the first bypass line 102 may be disposed between a first stage 98 and a second stage 100 of the heat exchanger 94, such that a bypass oxidant flow 96 (e.g., bypass air) may bypass the second stage 100 of the heat exchanger 94. The first bypass line 102 may be coupled to the controller 56 such that the flow rate of the bypass oxidant 96 (e.g., bypass air) through primary port 118 disposed on the first bypass line 102 may be controlled via a primary bypass valve 104. In some embodiments, the second bypass line 106 may bypass only the first stage 98 of the heat exchanger 94 and be disposed between the first stage 98 and the second stage 100 of the heat exchanger 94. The bypass oxidant 96 (e.g., bypass air) may bypass the first stage 98 of the heat exchanger, and the controller 56 may control the flow rate of the bypass oxidant 96 (e.g., bypass air) through secondary port 116 which passes through the second stage 100 of the heat exchanger 94. The controller 56 may utilize a secondary bypass valve 110 to control the flow of the bypass oxidant 96 (e.g., bypass air). A third bypass line 108 may bypass the first stage 98 and the second stage 100 of the heat exchanger 94 completely. The controller 56 may control the flow rate of the bypass oxidant 96 (e.g., bypass air) through a tertiary port 114 via a tertiary bypass valve 112. In some embodiments, the compressed air flow 16 is directed through both the first stage 98 and the second stage 100 of the heat exchanger 94, such that none of the bypass lines (e.g., first bypass line 102, second bypass line 106, third bypass line 108) are utilized. The controller 56 may receive signals from one or more sensors 70. As described above, the controller 56 may be configured to control the flow of the compressed air flow 16 as a result of a signal received from one or more sensors 70.

Presently contemplated embodiments may include a method of compressing an air flow to form the compressed air flow 16 to be provided to the engine 14, and controlling the temperature of the compressed air flow 16 provided to the engine 14. Controlling the temperature of the compressed air flow 16 includes cooling a portion 28 of the compressed air flow 16 via the heat exchanger 26. When the bypass portion 34 is increased, the portion 38 is decreased, resulting in the compressed air flow 16 remaining hotter than when the bypass portion 34 is decreased. When the bypass portion 34 is decreased, the portion 28 is increased, thereby cooling the compressed air flow 16. The method may also include controlling the bypass coolant portion 80 that bypasses the heat exchanger 26. When the bypass coolant portion 80 is increased, the remainder coolant 51 is decreased, enabling the compressed air flow 16 to remain hotter than when the bypass coolant portion 80 is decreased. When the bypass coolant portion 80 is decreased, the remainder coolant 51 is increased, thereby cooling the compressed air flow 16. The heat exchanger 26 may be coupled to the engine cooling system to cool the engine via circulation of a coolant (e.g., water) flow. The method may include controlling the temperature of the compressed air flow 16 provided to the engine 14 based at least in part on a load 21 driven by the engine.

Technical effects of the invention include active control of the temperature of a charged oxidant (e.g., compressed air) provided to HCCI or PCCI engines at varying loads. Active control of the temperature of the charged oxidant enables faster, more accurate transitions between varying loads, thereby improving efficiency of HCCI and PCCI engines. The flow rate, composition, and pressure of the charged oxidant may also be controlled. Various combinations of heat exchangers and bypass lines can be arranged in the compressed oxidant system to enable rapid temperature control of the compressed air. Bypass lines enable the temperature of the compressed air flow to be controlled by adjusting bypass ratios. When a bypass portion is increased, the portion is decreased, resulting in the compressed air flow remaining hotter than when the bypass portion is decreased. When the bypass portion is decreased, the portion is increased, thereby cooling the compressed air flow. When a bypass coolant portion is increased, the remainder coolant is decreased, enabling the compressed air flow to remain hotter than when the bypass coolant port is decreased. When the bypass coolant portion is decreased, the remainder coolant is increased, thereby cooling the compressed air flow. Both the bypass line and the heat exchanger bypass line may be independently controlled to control the temperature of the compressed air flow such that HCCI and/or PCCI engine loads can be met to enable rapid adjustments between dynamic loads.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a compressed air system configured to couple to an engine, the compressed air system comprising:
   a compression device configured to compress an air flow;
   a heat exchanger configured to exchange heat with the air flow along a first flow path, wherein the heat exchanger comprises a first stage and a second stage, the first stage is configured to exchange heat between a first coolant of a first coolant circuit and the air flow along the first flow path, and the second stage is configured to exchange heat between a second coolant of a second coolant circuit and the air flow along the first flow path, wherein the first coolant circuit is separate from the second coolant circuit; and
   a bypass system configured to flow the air along a second flow path that bypasses the heat exchanger, wherein the compressed air system is configured to selectively flow the airflow along the first flow path, the second flow path, or a combination thereof, to the engine.

2. The system of claim 1, wherein the compressed air system may include exhaust gas recirculation (EGR) gases.

3. The system of claim 1, wherein the first coolant circuit comprises water.

4. The system of claim 1, wherein the first stage of the heat exchanger comprises a high pressure stage that operates at a pressure greater than 600 kPa, and the second stage of the heat exchanger comprises a low pressure stage that operates at a pressure between 300 and 600 kPa.

5. The system of claim 1, comprising an engine cooling system, wherein the engine cooling system comprises:
a radiator coupled to the engine;
the heat exchanger;
the first coolant circuit coupled to the engine and the radiator, wherein the first coolant receives heat from the engine and the air flow along the first flow path; and
the second coolant circuit coupled to the radiator.

6. The system of claim 5, wherein the second coolant circuit comprises a heat exchanger bypass coupled to the heat exchanger and the radiator, wherein a heat exchanger bypass port is configured to direct a bypass coolant portion of the second coolant flow directly to the radiator and to direct a heated portion of the second coolant flow to the radiator via the heat exchanger, and the bypass coolant portion is the second coolant flow less the heated portion of the second coolant flow received by the heat exchanger.

7. The system of claim 1, comprising a control system, comprising:
a bypass control valve coupled to a bypass port, wherein the bypass control valve is configured to control a ratio of a bypass portion to the compressed air flow; and
a controller coupled to the bypass control valve, wherein the controller is configured to control the bypass control valve to adjust a temperature of the compressed air flow provided to the engine based at least in part on a load coupled to the engine.

8. The system of claim 1, wherein the compression device may be one of a turbocharger and a supercharger.

9. A system comprising:
a controller configured to control a temperature of a compressed air flow provided to an engine, wherein the controller is configured to control the temperature via control of an oxidant ratio and a coolant ratio, wherein the oxidant ratio comprises a first ratio between a bypass air flow that bypasses a heat exchanger and the compressed air flow provided to the engine, and the coolant ratio comprises a second ratio between a second bypass coolant flow that bypasses the heat exchanger and a second remainder coolant flow through the heat exchanger;
wherein the heat exchanger comprises a first stage and a second stage, the first stage is configured to exchange heat between a first coolant of a first coolant circuit and the compressed air flow through the heat exchanger, and the second stage is configured to exchange heat between the second remainder coolant flow of a second coolant circuit and the compressed air flow through the heat exchanger, wherein the first coolant circuit is separate from the second coolant circuit.

10. The system of claim 9, wherein the controller is configured to control the temperature of the compressed air flow based at least in part on a load driven by the engine.

11. The system of claim 9, wherein the controller is configured to control the temperature of the compressed air flow without utilizing a cold weather package coupled to the engine.

12. The system of claim 9, wherein the bypass air flow comprises a non-zero flow rate that bypasses the heat exchanger.

13. The system of claim 9, wherein the second bypass coolant flow comprises a non-zero flow rate that bypasses the heat exchanger.

14. The system of claim 9, comprising the engine, wherein the engine operates with homogenous charge compression ignition (HCCI), pre-mixed charge compression ignition (PCCI), or any combination thereof.

15. The system of claim 6, wherein the first coolant circuit comprises a first heat exchanger bypass coupled to the heat exchanger and the radiator, wherein a first heat exchanger bypass port is configured to direct a first portion of the first coolant flow directly to the heat exchanger from the engine, and to direct a second portion of the first coolant flow to the heat exchanger via the radiator, wherein the first portion is the first coolant flow less the second portion of the first coolant flow received by the radiator.

* * * * *